United States Patent

Hasson

[15] 3,706,307
[45] Dec. 19, 1972

[54] GYNECOLOGICAL INSTRUMENT

[72] Inventor: Harrith M. Hasson, Chicago, Ill.

[73] Assignee: Hollister Incorporated

[22] Filed: July 8, 1970

[21] Appl. No.: 53,084

[52] U.S. Cl. ............................................. 128/2 S
[51] Int. Cl. ............................................. A61b 5/00
[58] Field of Search ... 128/2 R, 2 S, 2 M, 343, 349 R, 128/350 R, 361; 33/197, 205, 172 E, 174 D

[56] References Cited

UNITED STATES PATENTS

| | | | |
|---|---|---|---|
| 3,108,595 | 10/1963 | Overment | 128/350 R |
| 3,241,554 | 3/1966 | Coanda | 128/350 R |
| 3,095,871 | 7/1963 | Mann et al. | 128/2 S |
| 2,541,520 | 2/1951 | Kegel | 128/2 S |

FOREIGN PATENTS OR APPLICATIONS

| | | | |
|---|---|---|---|
| 141 | 1894 | Great Britain | 128/2 S |

*Primary Examiner*—William E. Kamm
*Attorney*—Hofgren, Wegner, Allen, Stellman & McCord

[57] ABSTRACT

A gynecological measuring instrument for use in measuring anatomical features of the cervical canal, isthmus and uterus characterized by a shaft telescoped within a tube and connected to the distal end of the tube, with the tube being preferably formed of a pliable material and provided with spaced slits adjacent the free end thereof so that relative retraction of the tube relative to the shaft forms laterally extending wings in the area of the slits. Numerical indicia are provided along the length of a body for the shaft. When the device is inserted through the cervical canal to the top of the uterus the entire depth of the cervical canal and endometrial cavity can be measured. When the tube is retracted relative to the shaft and then the entire assembly is retracted until the isthmus is located, the difference between the two dimensions may be measured, indicating the individual length of each of the cervical canal and the endometrial cavity. Anatomic features of the cervical isthmic junction, including competence, also may be assessed.

14 Claims, 7 Drawing Figures

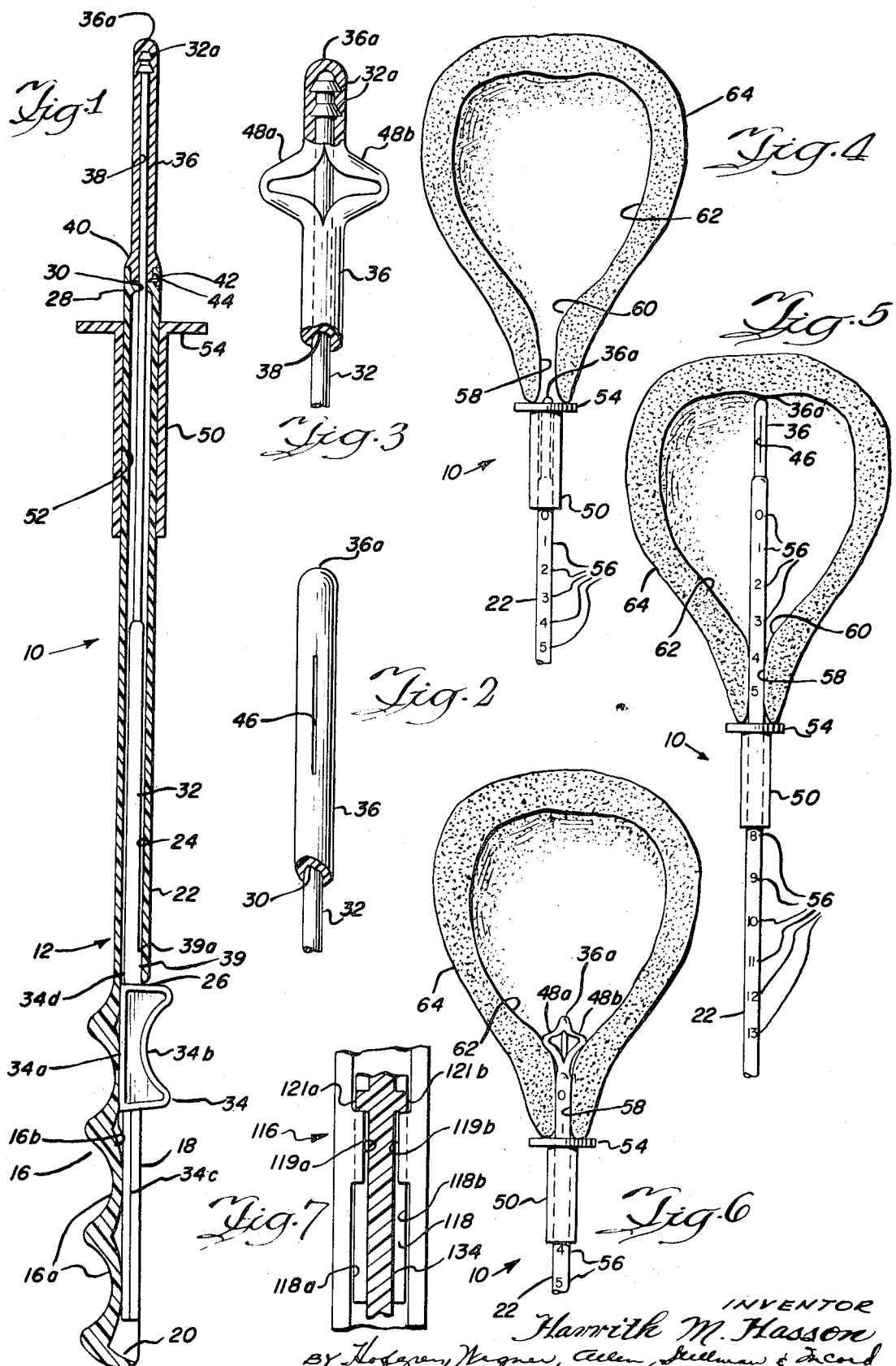

GYNECOLOGICAL INSTRUMENT

BACKGROUND OF THE INVENTION

1. Field of the Invention

This invention relates to medical-surgical appliances and, more particularly, to a gynecological measuring instrument.

2. Brief Description of the Prior Art

Devices known to the applicant which deal with measuring the depth of a human cavity include the following U.S. Pat. Nos.: Spiro 1,054,802; Fist 2,241,451; and Ward 3,058,225.

First shows a vaginal measuring device with an expansible loop on the free end thereof for measuring the depth of the vaginal cavity. Spiro shows a device intended for measuring the progress of labor and it is intended that a disc-like end of an engaging member would be introduced into a patient until the fetus is engaged and then the descent of the fetus would be measured by relative movement of parts of the instrument. Ward illustrates an electrical measuring device including a depth probe operably associated with a resistor wherein the movement of the probe causes a pointer on a scale or meter to indicate depth of movement of the probe.

With the increasing awareness of unique anatomical conditions which may be indicative of uterine abnormalities and with the increasing use of intrauterine contraceptive devices, it is most desirable to be provided with a gynecological measuring and probing instrument which can provide essential items of information relating to the individual measurement of the cervical canal and the endometrial cavity. It is to the satisfaction of a need and desire to provide such an instrument that the present invention is directed.

SUMMARY OF THE INVENTION

This invention is directed, in brief, to the provision of an improved gynecological instrument for measuring the cervical canal and the endometrial cavity of the uterus.

The best mode currently contemplated by me for carrying out the invention includes the provision of a structure of an elongate shaft received within a tubular body. At the distal end, the shaft is secured within a tube and the tube is provided with spaced slits so that when the tube and the shaft are relatively retracted, the tube spreads apart at the slits to provide laterally projecting wings. Indicia are provided preferably along the length of the body for the shaft.

BRIEF DESCRIPTION OF THE DRAWINGS

FIG. 1 is a sectional view of the gynecological measuring instrument of this invention;

FIG. 2 is a partially broken fragmentary enlarged view of the distal end of the device of this invention;

FIG. 3 is a view similar to FIG. 2 and partially broken away in section and showing the relationship of the components when the tube has been retracted relative to the shaft to form laterally extending winglike members;

FIG. 4 is a section view through the cervical canal and uterine cavity illustrating the device in use in the initial position prior to insertion into the canal and cavity;

FIG. 5 is another section view through the cervical canal and uterine cavity illustrating the device in use as being fully inserted until the distal end reaches the top of the uterine cavity or the uterine fundus;

FIG. 6 is a view similar to FIG. 4 showing the tube relatively retracted with respect to the shaft and the entire instrument retracted until such time as the isthmus or the cervical isthmic junction is reached so that a second dimensional reading may be taken; and FIG. 7 is a fragmentary section view of a modified handle portion of the gynecological instrument of this invention showing an alternative arrangement for locking the instrument in a retracted mode.

While this invention is susceptible of embodiment in many different forms, there is shown in the drawings and will herein be described in detail a specific embodiment therefor, with the understanding that the present disclosure is to be considered as an exemplification of the principles of the invention and is not intended to limit the invention to the embodiment illustrated.

BRIEF DESCRIPTION OF THE PREFERRED EMBODIMENT

The gynecological measuring instrument 10 of this invention comprises an elongate probe or body 12 preferably made of a yieldable plastic material and including a handle portion 16 at its proximal end. Handle portion 16 includes finger notches 16a and mating inner crests 16b in an interior channel 18 open at one side. Channel 18 terminates in a rear stop 20.

Body 12 includes a somewhat U-shaped partly cylindrical portion 22 having a hollow interior 24. Portion 22 extends from a proximal end 26, which opens to channel 18, and terminates in a distal end 28 having an opening 30 therein.

The instrument further includes an actuator rod or shaft portion 32 of a size and shape to be received within the hollow interior 24 of tubular portion 22. Rod portion 32 terminates in radial enlargements 32a at the distal end thereof.

Portion 32 further includes a button portion 34 of a size and shape to be received in the channel portion 18 of handle 16. Button portion 34 has a preferably flat bottom 34a to facilitate to and fro movement thereof. In addition, a recessed top 34b is formed in button 34 for receiving the thumb or finger of the person actuating the instrument. End extension 34c of button 34 combines with rear stop 20 of the handle 16 to limit the rearward movement of the button portion 34 and connected structure.

A tube 36, preferably of a flexible vinyl material, is telescoped over the distal end of the rod 32. Tube 36 has a hollow interior 38 of a size and shape to snugly receive rod 32 and enlargements 32a on the rod 32 affix the distal end 36a of tube 36 with respect to the distal end of rod 32.

Means are provided for holding rod 32 in a retracted position. In the embodiment shown in FIG. 1 this means comprises an enlargement 39 on rod 32 at its proximal end, adjacent the forward portion of button 34. The enlargement 39 terminates at shoulder 39a. Preferably, the axial extent of enlargement 39 is approximately the same distance as the space between the end of button extension 34c and stop 20 when the button is in the forward position as seen in FIG. 1.

In operation, when button 34 is retracted until extension 34c abuts stop 20, enlargement 39 will be brought rearwardly clear of the open end of portion 22 and shoulder 39a will abut thereagainst, as button 34 rides slightly upwardly over the inner crests 16b of handle portion 16, to hold the button locked rearwardly until digital depressing and advancing force is applied thereto. Tube 36 is further provided with an annular flange 40 and a depending stop 42 for abutting a stop 44 on the end of portion 22 to limit reverse axial movement of tube 36 with respect to tubular portion 22.

Tube 36 has oppositely arranged, longitudinally extending slits 46. When rod 32 is retracted relative to portion 22, tube 36 is pulled downwardly by the connection or enlargements 32a in the distal end 36a of tube 36. The abutment of flange 40 and stop 42 against abutment 44 on portion 22 prevents movement of tube 36 relative to portion 22 as well as relative to rod portion 32 except in the area of slits 46. Thus, the tube yields in the area of the slits 46 forming a pair of generally oppositely disposed, laterally extending retention wings 48a and 48b.

To assist in the use of the device, it is contemplated that a cylindrical sleeve 50 would be provided, the sleeve 50 having a hollow interior 52 of a size and shape to snugly fit over the exterior of tubular portion 22. Preferably, the sleeve 50 would also include an annular flange at one end.

As best seen in FIG. 4, indicia 56 are provided on the exterior of tubular portion 22, offset from the distal end 36a of tube 36 a distance equal to the longitudinal or axial dimension of cylindrical sleeve 50, to permit offset readings of measurements to be made with the device. It is to be understood that the device 10 could be used without a sleeve 50, in which case, the indicia 56 would read directly relative to 36a.

In use, it is intended that the instrument 12 could be inserted into the cervical canal 58 and through the isthmus 60 into the endometrial cavity 62 of the uterus 64. When the distal end 36a abuts the top of the endometrial cavity or the uterine fundus, the distance is measured by reading the indicia 56 on the portion 22. Following this, the tube is retracted to from the wings 48a and 48b by moving button 34 rearwardly to cause rod 32 to pull tube 36 as shown in FIGS. 3 and 6. The entire assembly is then retracted until the wings 48a and 48b reach the isthmus 60. At this time, another reading is taken by viewing the indicia 56. One cm. is subtracted from the index read on indicia 56, which represents the distance between distal end 36a, and the level of wings 48a and 48b. The wings are at the level of the isthmus or upper end of the cervical canal which is the upper point of measurement of the cervical canal. By means of comparing the two measurements, the length of the cervical canal and the length or height of the endometrial cavity may be determined. These measurements may be used to several advantages. A long cervix is considered to be an infertility factor. Previous diagnosis has been made by radiologic means, but with the aid of the present invention, such readings may be made without exposing the patient to radiation and are believed to be easier and more accurate.

Knowledge of such measurements is also important in utilization in placing intrauterine devices in a patient. These devices are graded according to size. Present methods of choice of an intrauterine device, such as by estimating the uterine size by manual pelvic examination, and sounding the uterus by measuring its overall length, are considered to be unsatisfactory. The uterine cavity is not necessarily related to outside measurements of uterine size, and factors such as obesity and/or a full bladder may produce erroneous estimates. With respect to the sounding depth measurements, these take into consideration the overall length of the cervix and uterine cavity. However, if the cervix is extremely short and the uterine cavity elongate, or vice versa, two entirely different situations exist which would require different sized intrauterine devices, even thought the entire dimension might be the same.

Another useful feature of the device of the present invention is that when the device is in the position shown in FIG. 6 with wings 48a and 48b adjacent the isthmus of the cervical canal, so-called "cervical competence" may be determined. The determination of cervical competence is useful both in examination for intrauterine devices as well as examinations relating to pregnancy. The competence refers to the restrictive ability of the cervical os. The competent cervix has sufficient restrictive capacity for ordinarily retaining an intrauterine device. In addition, the competent cervix also has sufficient restrictive ability to retain the fetus in the uterus and prevent premature expulsion. Thus, in determining the relative cervical competence, a doctor may anticipate in advance problems in either retaining an intrauterine device or problems relating to possible premature expulsion of the fetus, and can take appropriate steps to avoid these problems. Existing means for physical diagnosis of this entity, mainly radiologic methods, are less accurate and more difficult. This feature of "cervical competence" may be determined by attempting to further withdraw the instrument 10 in its relative retracted state with the protruding wings 48a and 48b shown in FIG. 6. If there is resistance to such further withdrawal, then the cervix may be considered to be "competent." However, if no resistance is encountered, this would be an indication that the cervix is not "competent." The degree of incompetence may be measured with instruments with increasingly larger wing spreads.

It is believed that other uterine abnormalities can be readily diagnosed with the aid of the instrument of this invention through careful exploration utilizing the flange-like area created with the wings 48a and 48b. The device is extremely simply to use and may be very inexpensively manufactured so as to be disposable after a single use and eliminate problems of sterilization and possible germ transfer and the like.

The instrument of this invention may also be made with a shorter handle than that shown herein in that the handle need only be long enough to accomplish the slight rearward movement of the rod 32 which closes the wings 48a and 48b to extend laterally outwardly. In such cases the portions 22 and 36 together with the rod 32 may be lengthened relative to the showing herein to increase the probing capability of the instrument.

Another means for holding rod 32 in the retracted position is shown in FIG. 7. As illustrated therein, the handle 116 has a channel 118 similar to channel 18 of handle 16. In the opposite side walls 118a and 118b of the channel 118 there are two opposed inwardly extending ribs or restriction means 119a and 119b. Button 134 has opposed, outwardly projecting enlargements or nibs 121a and 121b which are spaced relative to the location of the ribs 119a and 119b so that when the nibs are on the forward side of the ribs relative to distal end 36a, the wings 48a and 48b are retracted. However, when the button is pulled rearwardly to move nibs 121a and 121b past the restrictions 119a and 119b, then the rod 32 will be held in a retracted state with the wings 48a and 48b extended. Such forward and rearward movement of button 134 may be accomplished by digital pressure applied thereto with the side walls 118 a and 118b yielding slightly to allow for the to and fro movement of the nibs.

The foregoing detailed description has been given for clearness of understanding only, and no unnecessary limitations should be understood therefrom, as some modifications may be obvious to those skilled in the art.

I claim:

1. An instrument for determining anatomical characteristics of body cavities and passageways and the like comprising: an elongate body, a shaft-like member movably mounted on the body and having a distal end and a proximal end movably associated with the body; and radial enlargement means coacting with said body and said shaft member distal end, said radial enlargement means being movable between a non-interference position for insertion of said member in a restricted body passageway leading to a cavity or the like, and an interference position affording discernible resistance to withdrawal from a cavity through a reduced passage responsive to movement of the shaft-like member relative to the body, an outer sleeve slidably positioned about the body and having a distal end and a proximal end, and wherein said body is provided with indicia on the exterior thereof with the indicia being offset from the distal end of the instrument a distance approximating the length of the outer sleeve.

2. The instrument of claim 1 wherein the enlargement means is on the distal end of the shaft-like member and includes a tube-like member telescoped thereover, wherein the tube-like member is formed of a deformable material and includes generally opposed axially extending slits near the distal end thereof whereby retraction of the distal end of the tube-like member relative to said body causes radial extension of portions of said tube-like member in the area of said slits to provide said radial enlargement means, and wherein the distal end of said tube-like member is secured to the distal end of said shaft-like member beyond the slit portions of said tube-like member against movement relative thereto.

3. The instrument of claim 1 wherein the body is a generally cylindrical structure with said shaft-like member received therein and wherein the body is provided with a handle at the proximal end and the shaft-like member includes an extension positioned in the handle portion of the body.

4. The instrument of claim 3 wherein the body includes an abutment portion and the shaft-like member includes an enlargement spaced from the proximal end for abutting the abutment portion of the body, the enlargement terminating in a shoulder adjacent the shaft-like member extension for holding the shaft-like member retracted.

5. The instrument of claim 4 wherein the shaft-like member extension includes a button which extends outwardly from the handle and normally abuts the proximal end of the cylindrical body with the shoulder on the shaft-like member spaced from the abutment portion of the body a distance approximating the retracting movement of the shaft-like member.

6. The instrument of claim 4 wherein the handle has an interior channel with inwardly directed ribs forming the abutment portion on the body and the shaft enlargements comprise nibs on opposite sides of the shaft extension.

7. A probing instrument for determining anatomical characteristics of body cavities and passageways and the like, comprising:
   a. a hollow elongate probe having a handle at one end and a distal end remote from the handle adapted to be inserted into a body cavity,
   b. an actuator rod slidably mounted in the probe,
   c. radially displaceable retention means coacting with the probe and the actuator rod for movement between a radially retracted position for insertion of said probe into a restricted body passageway leading to a cavity or the like, and a radially extended interference position affording discernible resistance to withdrawal of the probe from a cavity through a reduced passageway responsive to movement of the actuator rod in the probe,
   d. an outer sleeve slidably mounted on the probe and having a distal end remote from the probe handle adapted to engage the outside of the body when the probe is inserted through a passageway and a proximal end projecting toward the probe handle,
   e. a scale on the probe beginning at a position spaced from the distal end of the probe by an amount corresponding to the length of the sleeve and extending toward the probe handle,
   f. so that when the probe is inserted in a body cavity and the distal end of the sleeve is positioned to engage the outside of the body, the distance from the distal end of the sleeve to the distal end of the probe is readable on the scale at the proximal end of the sleeve.

8. A probing instrument as defined in claim 7, wherein the distal end portion of the probe is tubular flexible material secured at the end to the end of the actuator rod and having angularly spaced longitudinally extending slits with radially displaceable material between the slits, so that when the actuator rod is longitudinally extended the material between the slits is radially retracted, and when the actuator rod is longitudinally retracted the material between the slits is radially extended to resist withdrawal of the probe from a cavity.

9. A probing instrument as defined in claim 7, including a channel in the handle of the probe, a button on the actuator rod projecting outwardly from the channel for manual contact, cooperating yieldable detent means on the probe and the actuator rod for retaining the actuator rod in longitudinally retracted position.

10. A probing instrument as defined in claim 9, wherein the handle of the probe has downwardly opening finger recesses and the button on the actuator rod has an upwardly facing thumb recess to permit holding of the instrument and operation of the actuator rod with a single hand.

11. A probing instrument as defined in claim 9, wherein the probe and rod are made of flexible plastic material and the detent means includes a shoulder on the rod engageable behind a shoulder on the probe.

12. A probing instrument as defined in claim 11, wherein the detent means comprises opposed ribs on the probe projecting into the channel in the handle, and outwardly extending opposed nibs on the actuator rod cooperable with the ribs.

13. A probing instrument for determining anatomical characteristics of body cavities and passageways and the like, comprising:
   a. a hollow elongate probe having a handle at one end and a distal end remote from the handle adapted to be inserted into a body cavity,
   b. an actuator rod slidably mounted in the probe,
   c. radially displaceable retention means coacting with the probe and the actuator rod for movement between a radially retracted position for insertion of said probe into a restricted body passageway leading to a cavity or the like when the rod is extended, and a radially extended interference position affording discernible resistance to withdrawal of the probe from a cavity through a reduced passageway responsive to retraction of the actuator rod in the probe,
   d. said handle having a hand grip portion including at least one downwardly opening recess for receiving one or more fingers of a hand and an upwardly opening channel above the recess slidably receiving the proximal end of the actuator rod,
   e. a button on the actuator rod projecting upwardly from the channel for manual contact,
   f. so that the probe may be held and retained against longitudinal movement by fingers engaging the bottom of the handle and the rod may be longitudinally manipulated by the thumb of the same hand on the button of the rod.

14. A probing instrument as defined in claim 13, wherein the probe and rod are made of flexible plastic material and include cooperable yieldable detent means for retaining the actuator rod in longitudinally extended and retracted positions.

* * * * *